United States Patent Office 3,775,372
Patented Nov. 27, 1973

3,775,372
PRODUCTION OF HIGH MOLECULAR WEIGHT LINEAR POLYESTERS
Lambert Gaston Jeurissen, Edegem, Belgium, assignor to Agfa-Gevaert N.V., Mortsel, Belgium
No Drawing. Filed Oct. 19, 1971, Ser. No. 190,649
Claims priority, application Great Britain, Aug. 27, 1971, 51,236/70
Int. Cl. C08g 17/013
U.S. Cl. 260—75 R  5 Claims

ABSTRACT OF THE DISCLOSURE

High molecular weight linear polyesters are produced by an ester interchange reaction between a glycol and a diester of terephthalic acid followed by polycondensation of the ester interchange products formed. The ester interchange reaction is carried out in the presence as a catalyst of a manganese(II) or zinc salt of a monocarboxylic acid of the formula:

X—Y—COOH wherein X is an unsubstituted or alkyl-substituted aryl group and Y is a straight chain or branched chain alkylene group of 1 to 4 carbon atoms.

---

This invention relates to the production of high molecular weight linear polyesters, and particularly to the production of high molecular weight polyethylene terephthalate.

High molecular weight linear polyesters are generally produced according to two different procedures each consisting of two different reaction steps. In the first step of one procedure a direct esterification takes place between a dicarboxylic acid and a glycol, followed in the second step by a polycondensation of the resulting diglycol dicarboxylates to high molecular weight linear polyesters. In the first step of the second procedure an ester interchange reaction is carried out between a glycol and a diester of a dicarboxylic acid, whereby also diglycol dicarboxylates are formed, which step is also followed by a polycondensation step wherein the diglycol dicarboxylates are transformed into high molecular weight linear polyesters. It is to be noted that in the first step of both procedures not only diglycol dicarboxylates are formed, but also varying amounts of low molecular weight polyesters derived therefrom. For convenience sake, however, the mixture obtained after the first reaction steps will always be referred to hereinafter as "diglycol dicarboxylate."

Although the first procedure using direct esterification followed by polycondensation is not at all to be excluded, the second procedure wherein an ester interchange reaction is followed by a polycondensation, is most commonly used. The reason why is that terephthalic acid to be used as dicarboxylic acid was very difficult to obtain on a sufficient degree of purity until recently, whereas the diesters of terephthalic acid, especially the dimethyl terephthalate used in the ester interchange reaction, could be purified much easier.

There has now been found a new class of catalysts that are soluble in the reaction mixture and that can be used in the preparation of diglycol dicarboxylates, especially of ester interchange products between a glycol and a diester of a dicarboxylic acid, more especially between ethylene glycol and dimethyl terephthalate.

According to the invention a process is provided for the production of highly polymeric linear polyesters by ester interchange and polycondensation reactions, which process comprises heating a glycol and a diester of terephthalic acid at an elevated temperature and polycondensation of the ester interchange products formed to high molecular weight linear polyesters, characterized in that the ester interchange reaction is carried out in the presence of a catalyst of a managanese(II) or zinc salt of a monocarboxylic acid corresponding to the general formula:

X—Y—COOH wherein:
X represents an unsubstituted or alkyl-substituted aryl group, and
Y represents a straight chain or branched chain alkylene group of 1 to 4 carbon atoms.

Suitable monocarboxylic acids, the manganese(II) or zinc salts of which can be used as ester interchange catalyst are, e.g.:

phenylacetic acid
o- and p-tolylacetic acid
m- and p-ethylphenyl acetic acid
α- and β-naphthyl acetic acid
3-phenylpropionic acid
3-dimethyl-3-phenyl propionic acid
2-, 3- and 4-phenyl-n-butyric acid
2-methyl-2-phenyl-n-butyric acid
2-methyl-3-phenyl-n-butyric acid
2-methyl-4-phenyl-n-butyric acid
2-, 4- and 5-phenyl-n-valeric acid.

These monocarboxylic acids have been described in the book of R. B. Wagner and H. D Zook: Synthetic Organic Chemistry, New York, John Wiley & Sons, Inc. (1953) pages 442 and 443.

Other suitable monocarboxylic acids are:

2-ethyl-3-phenyl-propionic acid (558)
3-ethyl-3-phenyl-propionic acid (559)
α-naphthyl-propionic acid (668)
p-tolyl-n-butyric acid (559)
o-tolyl-propionic acid (544)
m-tolyl-propionic acid (545)
p-tolyl-propionic acid (551)

The numbers between brackets indicate the pages of Beilstein vol. IX, where these monocarboxylic acids have been described.

Although other manufacturing processes can be used, the manganese(II) salts of these monocarboxylic acids are generally prepared by treating solutions of the acids with an excess of manganese(II) carbonate until neutralization. After filtering off the precipitated salts they are dried in vacuo (Ber. 34, 3654 (1901)). The zinc salts of the monocarboxylic acids can be prepared by treating the acids in water with zinc chloride in the presence of sodium hydroxide.

The manganese(II) or zinc salts of monocarboxylic acids of the invention greatly increase the reaction speed of the ester interchange between a glycol, more particularly ethylene glycol, and a diester of terephthalic acid, more particularly dimethyl terephthalate. The ester interchange reaction is carried out by heating a mixture of both reactants in a molar ratio of glycol to diester of terephthalic acid of at least 1.5:1, preferably of at least 2:1. To this mixture the catalyst is added in an amount between $5 \times 10^{-5}$ and $1 \times 10^{-3}$ moles with respect to the number of moles of diester of terephthalic acid present. Amounts of catalysts beyond this upper limit are uneconomic since they will not increase the reaction rate any further.

The reaction mixture is heated to a temperature between the boiling point of the glycol and the boiling point of the monohydroxy compound from which the diester of terephthalic acid has been formed. The reaction may be carried out at atmospheric pressure, although superatmospheric and reduced pressures may also be used.

At least at the end of the ester interchange reaction slightly reduced pressures are preferred to aid in the removal of the monohydroxy compound formed.

During the ester interchange reaction diglycol dicarboxylates are formed together with varying amounts of low molecular weight oligomeric polyesters. Without removal of this mixture of glycol dicarboxylates and oligomers from the reaction system, a known polycondensation catalyst may be added, the temperature increased to 200–300° C., and the pressure reduced progressively to a pressure of 1.0 mm. of mercury or less. The polycondensation reaction is carried out until polyesters having an inherent viscosity of at least 0.3, preferably above 0.6 are obtained.

The examples hereinafter describe the preparation of polyethylene terephthalate starting from ethylene glycol and dimethyl terephthalate. The process of the invention is not restricted, however, to the preparation of polyethylene terephthalate by an ester interchange reaction. Also an esterification of terephthalic acid with ethylene glycol using the manganese(II) or zinc salts of monocarboxylic acids of the invention as direct esterification catalysts can be carried out. When using the manganese(II) or zinc salts of monocarboxylic acids of the invention as direct esterification catalyst or as ester interchange catalysts, other glycols can also be employed, e.g. 1,4-di(hydroxymethyl)-cyclohexane. In this way a large number of different nearly colourless and very clear polyesters can be prepared. In a direct esterification reaction the terephthalic acid itself may be replaced partially or wholly by other dicarboxylic acids, whereas the dimethyl terephthalate can be replaced also partially or wholly in the ester interchange reactions by other diesters of terephthalic acids e.g. diphenyl terephthalate, or by diesters of other dicarboxylic acids such as e.g. isophthalic acid, sebacic acid, and adipic acid.

The following examples illustrate the invention without limiting it thereto. In these examples the crystalline melting point of the polyester is determined by heating a crystallised sample of polyester on the heating stage of a polarising microscope. The temperature of the heating stage is raised at a rate of 0.8° C./min. The crystalline melting point is the temperature, at which between crossed nicols the last trace of birefringence disappears.

Differences in the melting point of subsequently prepared polyesters are mainly due to fluctuations in their diglycol content (diethylene glycol content in the case of polyethylene dicarboxylates). The higher this diglycol content, the lower is the melting point of the polyester in consequence of the internal plasticisation of the polyester by the diglycol present. Accordingly, when a particular polyester should have a high melting point, its diglycol content should be very low.

At the end of the polycondensation period the colour of the molten polyester is measured in a Lovibond Tintometer and recorded in terms of the Lovibond scale. This scale consists of permanent glass filters graduated in a strictly linear scale, from the palest perceptible colour to a fully saturated one, in the three subtractive primary colurs red, yellow, and blue. By selection of suitable combinations from these scales, any colour, as well as grey to black, can be matched. This method has been described in "Colorimetric Chemical Analytical Methods," 2 volumes of a loose-leaf textbook published by The Tintometer, Ltd., Salisbury, England.

EXAMPLE 1

A first solution was formed by dissolving 44 g. of sodium hydroxide in 200 ml. of water. To this solution 136 g. of phenyl acetic acid were added while stirring until a clear solution was formed.

A second solution was prepared by dissolving 84.5 g. of manganese(II) sulphate while heating in 300 ml. of water.

After filtration the second solution was added dropwise to the first solution. The mixture was cooled in a bath of ice-water, so that a precipitate was obtained, which was separated, dried by suction, and washed two times with a small amount of water. Finally, the product was dried in vacuo.

Yield: 150 g. of manganese(II) phenyl-acetate.

38.8 g. of dimethyl terephthalate and 27 g. of ethylene glycol were placed in a glass polymerization tube of 25 mm. inside diameter and 13 mg. of the manganese(II) phenyl-acetate ($2 \cdot 10^{-4}$ mole/mole of dimethyl terephthalate) were added. The reactants were heated for 2 h. to 197° C. under atmospheric pressure. A continuous stream of dry nitrogen was introduced through a capillary tube reaching to the bottom of the reaction tube. As soon as the ester interchange reaction was finished 4.2 mg. of germanium dioxide ($2 \cdot 10^{-4}$ mole/mole of dimethyl terephthalate) (in the form of a 1% solution in ethylene glycol) were added and the temperature was raised gradually over 30 min. to 282° C. and the unreacted ethylene glycol distilled off. Subsequently, 12 mg. of triphenyl phosphite ($2 \cdot 10^{-4}$ mole/mole of dimethyl terephthalate) were added as stabiliser.

The pressure was reduced to 0.1 to 0.3 mm. of mercury, while the reaction mass was stirred under dry nitrogen. After 3 h. at 282° C., vacuum was released. A polyethylene terephthalate polyester having an inherent viscosity of 0.715 dl./g. was obtained. The polyester had a clear aspect, had a Lovibond colour combination of 0.8 yellow and a melting point of 268° C. indicating a very low diethylene glycol content.

EXAMPLE 2

The process of Example 1 was repeated, with the difference, however, that the 13 mg. of manganese(II) phenyl-acetate had been replaced by 6.5 mg. ($1 \cdot 10^{-4}$ mole/mole of dimethyl terephthalate) and that the ester interchange reaction lasted 3 h. instead of 2 h. at 197° C., and that 6 mg. of triphenyl phosphite ($1 \cdot 10^{-4}$ mole/mole of dimethyl terephthalate) were added instead of 12 mg. The inherent viscosity of the polyethylene terephthalate obtained was 0.69 dl./g. The polyester had a clear aspect, had a Lovibond colour combination of 0.7 yellow and a melting point of 267.5° C.

EXAMPLE 3

The process of Example 1 was repeated, with the difference, however, that the 13 mg. of manganese(II) phenyl-acetate had been replaced by 3.3 mg. ($5 \cdot 10^{-5}$ mole/mole of dimethyl terephthalate) and that the ester interchange reaction lasted 4 h. at 197° C., whereas only 3 mg. of triphenylphosphite ($5 \cdot 10^{-5}$ mole/mole of dimethyl terephthalate), were used instead of 12 mg. The inherent viscosity of the polyester obtained was 0.70 dl./g. The other properties were the same as those described in Example 1.

EXAMPLE 4

38.8 g. of dimethyl terephthalate and 27 g. of ethylene glycol were placed in a glass polymerization tube of 25 mm. inside diameter and 14.1 mg. of manganese(II) p-tolyl acetate ($2 \cdot 10^{-4}$ mole/mole of dimethyl terephthalate) were added. The reactants were heated for 2 h. at 197° C. under atmospheric pressure. A continuous stream of dry nitrogen was introduced through a capillary tube reaching to the bottom of the reaction tube. As soon as the ester interchange reaction was finished, the temperature was raised gradually over 30 min. to 282° C. and the unreacted ethylene-glycol was distilled off. Subsequently 13.3 mg. of diphenyl titanocene ($2 \cdot 10^{-4}$ mole/mole of dimethyl terephthalate) and 13 mg. of triphenyl phosphate ($2 \cdot 10^{-4}$ mole/mole of dimethyl terephthalate) were added. The pressure was reduced to 0.1 to 0.3 mm. of mercury, while the reaction mass was stirred under dry nitrogen. After 3 h. at 282° C. vacuum was released. A polyethylene terephthalate polyester having an inherent viscosity of 0.69 dl./g. was obtained. The polyester had a clear aspect, had a Lovibond colour combination of 4.0 yellow and 1.1 red and a melting point of 266° C., indicating a low diethylene glycol content.

EXAMPLE 5

38.8 g. of dimethyl terephthalate and 27 g. of ethylene glycol were placed in a glass polymerization tube of 25 mm. inside diameter. 17 mg. of manganese(II) α-naphthyl acetate ($2 \cdot 10^{-4}$ mole/mole of dimethyl terephthalate) were added. The reactants were heated for 2 h. at 197° C. under atmospheric pressure. A continuous stream of dry nitrogen was introduced through a capillary tube reaching to the bottom of the reaction tube. As soon as the ester interchange reaction was finished, the temperature was raised gradually over 30 min. to 282° C. and the unreacted ethylene glycol was distilled off. Subsequently 4.2 mg. of germanium dioxide ($2 \cdot 10^{-4}$ mole/mole of dimethyl terephthalate) (as a 1% solution in ethylene glycol) and 13 mg. of triphenyl phosphate ($2 \cdot 10^{-4}$ mole/mole of dimethyl terephthalate) were added. The pressure was reduced to 0.1 to 0.3 mm. of mercury, while the reaction mass was stirred under dry nitrogen. After 3 h. at 282° C. vacuum was released and polyethylene terephthalate polyester having an inherent viscosity of 0.68 dl./g. was obtained. The polyester had a clear aspect, had a Lovibond colour combination of 0.9 yellow and 0.1 red and a melting point of 266° C. indicating a low diethylene glycol content.

EXAMPLE 6

38.8 g. of dimethyl terephthalate and 27 g. of ethylene glycol were placed in a glass polymerization tube of 25 mm. inside diameter and 22.9 mg. manganese(II) 3-phenyl butyrate ($3 \cdot 10^{-4}$ mole/mole of dimethyl terephthalate) were added. The reactants were heated for 1 h. 30 at 197° C. A stream of dry nitrogen was introduced through a capillary tube reaching to the bottom of the reaction tube. As soon as the ester interchange reaction was finished, 4.2 mg. of germanium dioxide ($2 \cdot 10^{-4}$ mole/mole of dimethyl terephthalate) (as a 1% solution in ethylene glycol) was added and the temperature was raised gradually over 30 min. to 282° C. and the unreacted ethylene glycol was distilled off. Subsequently, 19.5 mg. of triphenyl phosphate ($3 \cdot 10^{-4}$ mole/mole of dimethyl terephthalate) were added as stabiliser. The pressure was reduced to 0.1 to 0.3 mm. of mercury, while the reaction mass was stirred under dry nitrogen. After 3 h. at 282° C., vacuum was released. A polyethylene terephthalate polyester having an inherent viscosity of 0.69 dl./g. was obtained. The polyester had a clear aspect, had a Lovibond colour combination of 1.0 yellow and had a melting point of 267° C. indicating a very low diethylene glycol content.

EXAMPLE 7

38.8 g. of dimethyl terephthalate and 27 g. of ethylene glycol were placed in a glass polymerization tube of 25 mm. inside diameter and 13 mg. of manganese(II) phenyl acetate ($2 \cdot 10^{-4}$ mole/mole of dimethyl terephthalate) were added. The reactants were heated for 2 h. at 197° C. under atmospheric pressure. A continuous stream of dry nitrogen was introduced through a capillary tube reaching to the bottom of the reaction tube. As soon as the ester interchange reaction was finished 5.4 mg. of sodium trihydrogen germanate(IV) ($1 \cdot 10^{-4}$ mole/mole of dimethyl terephthalate) (as a 3% solution in ethylene glycol) were added. The temperature was raised gradually over 30 min. to 282° C. and the unreacted ethylene glycol was distilled off. Subsequently, 13 mg. of triphenyl phosphate ($2 \cdot 10^{-4}$ mole/mole of dimethyl terephthalate) were added as stabiliser. The pressure was reduced to 0.1 to 0.3 mm. of mercury, while the reaction mass was stirred under dry nitrogen. After 3 h. at 282° C. vacuum was released. A polyethylene terephthalate polyester having an inherent viscosity of 0.68 dl./g. was obtained. The polyester had a clear aspect, had a Lovibond colour combination of 1.0 yellow and 0.2 red and a melting point of 266.5° C. indicating a very low diethylene glycol content.

EXAMPLE 8

38.8 g. of dimethyl terephthalate and 275 g. of ethylene glycol were placed in a stainless steel autoclave equipped with a stirrer, a gas inlet and a rectifying column. After having added 130 mg. of manganese(II) phenylacetate, the mixture was stirred and heated for 3 h. at 197° C. under atmospheric pressure, while a continuous stream of dry nitrogen was introduced. The ester-interchange being finished, 42 mg. of germanium(IV) oxide (in the form of a 1% by weight solution in ethylene glycol) together with 130 mg. of triphenyl phosphate were added.

Subsequently the pressure was reduced to 0.1 to 0.3 mm. of mercury while the reaction mass was stirred under nitrogen. After 3 h. at 282° C., vacuum was released. A polyethylene terephthalate polyester was obtained having similar properties to that of Example 1.

EXAMPLE 9

In a stainless steel autoclave equipped with a stirrer, a gas inlet and a rectifying column, the following ingredients were introduced:

Dimethyl terephthalate _____kg__ 19.4
Ethylene glycol _____kg__ 12.4
Manganese(II) phenyl-acetate _____g__ 6.5

The mixture was stirred for 3 h. under atmospheric pressure while a continuous stream of dry nitrogen was introduced, and heated at 197° C.

Once the ester-interchange reaction was finished 2.1 g. of germanium(IV) oxide were added in the form of a 1% by weight solution in ethylene glycol. Then 6.5 g. of triphenyl phosphate were added as a stabilizer.

The polycondensation reaction occurred as described in Example 1 and a polyethylene terephthalate of similar properties was obtained.

EXAMPLE 10

To a solution of 136 g. of zinc phenyl-acetate and 44 g. of sodium hydroxide in 500 ml. of water a solution of 68.25 g. of zinc chloride in 250 ml. of water was added.

The reaction mixture was cooled and the white precipitate was sucked off and washed with a small quantity of water, whereafter it was dried at 110° C. Yield: 150 g. of zinc phenyl-acetate.

38.8 g. of dimethyl terephthalate and 27.3 g. of ethylene glycol were placed in a polymerization tube and 13.4 mg. of zinc phenyl-acetate were added. The reactants were heated for 3 h. at 200° C. under atmospheric pressure while a continuous stream of dry nitrogen was bubbled through the reaction mixture. As soon as the ester-interchange reaction was finished 4.2 mg. of germanium(IV) oxide (in the form of a 1% by weight solution in ethylene glycol) were added and the temperature was raised to 280° C.; the unreacted ethylene glycol was distilled off. Subsequently 13 mg. of triphenyl phosphate were added as a stabilizer and under a pressure of 0.1 to 0.3 mm. of mercury, the reaction mass was stirred for 2½ h. under dry nitrogen. A polyethylene terephthalate having an inherent viscosity of 0.65 dl./g. was obtained having a Lovibond colour combination of 0.6 yellow and 0.2 red.

I claim:

1. A process for the production of highly polymeric linear polyesters by ester interchange and polycondensation reactions, which comprises heating a glycol and a diester of terephthalic acid at an elevated temperature and polycondensation of the ester interchange products formed until high molecular weight linear polyesters are obtained, characterized in that the ester interchange reaction is carried out in the presence, as catalyst, of a manganese(II) or zinc salt of a monocarboxylic acid corresponding to the general formula:

$$X-Y-COOH$$

wherein:

X represents an unsubstituted or alkyl-substituted aryl group, and

Y represents a straight chain or branched chain alkylene group of 1 to 4 carbon atoms.

2. A process according to claim 1, wherein the ester interchange catalyst is added in an amount comprised between $5 \cdot 10^{-5}$ mole and $1 \cdot 10^{-3}$ mole with respect to the number of moles of diester of terephthalic acid present.

3. A process according to claim 1, wherein the manganese(II) salt of a monocarboxylic acid is manganese(II) phenyl-acetate.

4. A process according to claim 1, wherein the zinc salt of a monocarboxylic acid is zinc phenyl-acetate.

5. A process according to claim 1, wherein the glycol used is ethylene glycol and the diester of terephthalic acid is dimethyl terephthalate.

References Cited
UNITED STATES PATENTS

| | | | |
|---|---|---|---|
| 2,951,060 | 8/1960 | Billica | 260—75 |
| 3,372,185 | 3/1968 | Hergenrother | 260—475 |
| 3,446,763 | 5/1969 | Okuzumi | 260—22 |
| 3,673,157 | 6/1972 | Price et al. | 260—75 R |

MELVIN GOLDSTEIN, Primary Examiner

U.S. Cl. X.R.

260—475 P